United States Patent Office 3,360,533
Patented Dec. 26, 1967

3,360,533
PROCESS FOR THE IMPROVED
WINTERIZATION OF OIL
James C. Wootton, Springfield Township, Hamilton County, and Fredric J. Baur, Cincinnati, Ohio, assignors to The Procter & Gamble Company, Cincinnati, Ohio, a corporation of Ohio
No Drawing. Original application June 17, 1963, Ser. No. 288,438, now Patent No. 3,290,340, dated Dec. 6, 1966. Divided and this application May 17, 1966, Ser. No. 550,635
4 Claims. (Cl. 260—428)

ABSTRACT OF THE DISCLOSURE

Process to improve the ease of obtaining, and increasing the yields of winterized oils by adding a crystal modifier such as 1-palmitoyl-2,3-(β-carbethoxy propionin) to the oil to be winterized.

---

This is a divisional application of U.S. Patent 3,290,-340, Dec. 6, 1966.

This invention relates to novel derivatives of glycerol, and more particularly, it relates to substances in which glycerol is esterified with a monoester of succinic acid.

One of the most common glycerol derivatives is ordinary animal and vegetable fat which consists essentially of the tri-ester of glycerol in which all three hydroxy groups are esterified with saturated and/or unsaturated fatty acids. Such fatty acids range generally in chain length from about 8 to about 24 carbon atoms. These tri-esters, or fats, are naturally-occurring substances.

Other tri-esters of glycerol occur in nature. Examples of these are the phosphatides. In these compounds the glycerol is esterified with fatty acids and also with phosphoric acid. Examples of this class of materials are lecithin, in which the phosphoric acid is further esterified with choline, and cephalin, in which the phosphoric acid is similarly esterified with hydroxyethylamine.

In recent times partial and tri-esters of glycerol have been synthesized. Some of these synthetic materials are widely used for their surface active properties in applications such as emulsification. Examples of partial esters of glycerol are the mono- and diglycerides, which are so effective in permitting the incorporation of large amounts of sugar in commercial bakery cake recipes. Other applications involve the esters of acetic acid to form acetylated glycerides, or acetin fats, and of lactic acid to form emulsifiers useful in prepared culinary mixes.

It is an object of this invention to furnish new glycerol esters prepared from succinic acid monoesters.

It is a further object of the present invention to prepare substances which improve the filterability of winterized oils.

Yet another object of the instant invention is to provide substances useful as crystallization inhibitors which improve the chill-test properties of glyceride oils to make them suitable for use as salad oils.

Other and further objects of and benefits from the present invention will become apparent to those skilled in the art after they have read and become familiar with this disclosure.

The novel compositions of matter contemplated by the instant invention are defined by the formula

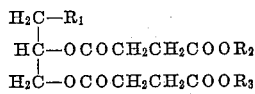

wherein $R_1$ is an alkanoyloxy group containing from 12 to 20 carbon atoms and $R_2$ and $R_3$ are each alkyl groups having from one to three carbon atoms in the molecule.

The fatty acid moiety used in the practice of this invention, that is, $R_1$, may be derived from any saturated fatty acid having from 12 to 20 carbon atoms; it may also be obtained from mixtures of saturated fatty acids and from fatty acids derived from substantially completely hydrogenated oils and fats which predominantly contain fatty acids having from about 12 to about 20 carbon atoms.

As used herein, the term "mono-ester" indicates that the dicarboxylic acid, succinic acid, has formed an ester with only one of the two carboxylic acid groups. A tri-ester of glycerol is one in which all three of the hydroxyl groups have formed an ester linkage with acid, while a di-ester is one in which only two of the three possible hydroxyl groups have formed an ester linkage with acid. Such partial esters of glycerol with one or two of the hydroxyl groups esterified with a fatty acid are also known as monoglycerides and diglycerides, respectively.

For convenience in describing the preparation of the novel substances of this invention, the succinic acid monoester with an alkyl alcohol may be referred to as β-carbalkoxypropionic acid or its derivatives. For example, the mono-ester of ethyl alcohol would be referred to as "β-carbethoxy propionic acid." In referring to the substances of this invention as described in the above structural formula, they will be designated as the fatty acid derivative of 2,3-di(β-carbalkoxy propionin). Thus a derivative of palmitic acid would be characterized "1-palmitoyl-2,3-di(β-carbalkoxy propionin)."

The compounds of this invention can be synthesized by a number of reaction routes. One method which has been found convenient involves the reaction of one mole of the fatty acid monoglyceride with at least two moles of β-carbalkoxypropionyl chloride in the presence of pyridine using chloroform as the solvent. The reaction mixture is permitted to stand for about two days, or until the reaction is complete; said mixture is dissolved in ethyl ether; and the by-products are removed by washing, first with water and then with dilute sulfuric acid, dilute sodium hydroxide, and water. The solvent is subsequently removed by evaporation. If desired, this product can be purified by crystallization from petroleum ether and hexane-ethanol. The preparation of 1-palmitoyl-2,3-di(β-carbethoxy propionin) by this method is set forth in Example 1 below.

Another route which may be used is to prepare the compound by esterifying 1,2-di-β-carbalkoxypropionin with palmitoyl chloride. Other methods will suggest themselves to those skilled in the art, but the first route discussed above is preferred.

The preparation of the substances of this invention is exemplified below.

Example 1

Three hundred grams (three moles) of succinic anhydride and 210 ml. of absolute ethanol were heated on the steam bath for two hours and then distilled. Three hundred and forty-seven grames (79% yield) of material boiling at 94–97° C. (at a pressure of 0.2–0.3 mm. of mercury) were collected. This material possessed an acid value of 384 and a saponification value of 768 which corresponds to the theoretical figures required for ethyl hydrogen succinate (the mono-ester). Three hundred and forty grams (2.86 moles) of thionyl chloride were added to the 347 grams (2.48 moles) of ethyl hydrogen succinate and the solution was heated on the steam bath for six hours. Excess thionyl chloride was distilled off and the residue was vacuum distilled. The yield of β-carbethoxypropionyl chloride was 347 grams (92%), b.p. 102–103° C. (at a pressure of 18–19 mm. of mercury). Calc'd. for $C_6H_9ClO_3$: Cl 21.7%. Found: Cl, 21.3%.

After the β-carbethoxypropionyl chloride had been prepared, 1-palmitoyl di-β-carbethoxypropionin was prepared by the following method:

One hundred and thirty-six grams of the monoglyceride of palmitic acid (0.41 mole) and 79 grams (1 mole) of pyridine were dissolved in 800 ml. of chloroform which had been previously water-washed and dried over sodium sulfate. One hundred and sixty-six grams (1.01 moles) of β-carbethoxypropionyl chloride were added slowly to the solution while the solution was being agitated. The reaction mixture was maintained at room temperture by cooling the reaction vessel in ice as necessary. After standing for two days at room temperature, the solution was diluted with ethyl ether and washed successively with water, a 5% aqueous solution of sulfuric acid, a 5% aqueous solution of sodium hydroxide, and finally with water. After drying over sodium sulfate, the solution was filtered and evaporated to yield 237 grams (98%) of product. This material was recrystallized once from six volumes of petroleum ether at −20° C. and finally from six volumes of 1:1 hexane-alcohol at 0° C. The product thus obtained melted at 38–40° C. and had a saponification value of 485, the theoretical saponification value of 1-palmitoyl-2,3,-di-(β-carbethoxypropionin) being 478.

Corresponding methyl, propyl and isopropyl derivatives are obtained by substituting equimolar quantities of methanol, propanol, and isopropanol for ethanol in the above example. A mixture of any or all of the alcohols could be used or a single alcohol could be used. In lieu of the palmitic monoglyceride, monoglycerides of lauric, myristic, stearic, and arachidic acids, or mixtures of any or all of these acids could be used. Additionally, monoglyceride prepared from substantially completely hydrogenated naturally-occurring fats, such as coconut, corn, cottonseed, olive, palm, peanut, safflower, sesame, and soybean, oils or fats such as lard, beef tallow, and mutton tallow, could be used to prepare the monoglyceride.

The compounds of this invention are useful, among other things, as crystal modifiers, as in the preparation of winterized oils by chilling and filtration; as crystal inhibitors, for example, improving the chill test in salad oils; and as suds-depressing agents for use in low-sudsing detergent compositions.

Examples of a few uses of these compounds are below exemplified with 1-palmitoyl-2,3-di-(β-carbethoxypropionin).

*Example 2*

One hundred grams of directed-interesterified soybean oil was maintained at 32° F. until crystallization equilibrium was reached. This oil acted as a blank for comparison. To another 100 g. sample of the same rearranged soybean oil was added 0.4 g. of the 1-palmitoyl-2,3-di-(β-carbethoxypropionin) prepared in Example 1. This oil also was maintained at 32° F. for a like period to attain crystallization equilibrium.

The two samples of oil were filtered through filter paper in a Büchner funnel, using a vacuum to aid the fluid flow. The ease of filtration was judged by noting the time required for the rate of filtration to slow to the rate of one drop in each 10 seconds. The yields of the crystallized and liquid fractions were recorded. The results are shown in the following table:

| Sample | Time (minutes) | Yield (percent) |
| --- | --- | --- |
| Control | 65 | [1] 53.7 |
| Soybean Oil Containing 1-palmitoyl-2,3-di-(β-carbethoxypropionin) | 20 | 60.8 |

[1] Liquid fraction.

It can be seen from the foregoing data that the requisite filtration was accomplished in less than one third of the time on the soybean oil containing 0.4 g. of the 1-palmitoyl-2,3-di-(β-carbethoxypropionin), and the yield of the desired winterized oil (liquid fraction) was about 7% greater.

The foregoing example demonstrates the use of the compounds of this invention as crystal modifiers to improve the ease of obtaining and yields of winterized oils. The glycerol derivatives of this invention are effective crystal modifiers when used in amounts from about 0.05 to 1.0 percent of the weight of the oil. The preferred range of usage of these compounds as crystal modifiers is from about 0.2 to about 0.6 percent by weight of the oil.

Entirely comparable results can be obtained when the novel compositions of matter of this invention are used as crystal modifiers in the process of winterizing cottonseed, soybean, corn, sunflower, olive, and peanut oils. Like results are also obtained on the oils just mentioned when said oils are rearranged or lightly hydrogenated and then winterized.

The process of winterization as used herein comprises the steps of chilling a liquid oil to a temperature substantially below 70° F., permitting the chilled oil to remain at that temperature until crystallization equilibrium has been obtained, and separating, as by filtration, the resultant mixture of crystals and oil to obtain a crystal fraction and a liquid oil fraction. The liquid oil fraction is then stable against crystal formation to temperatures at least as low as those to which it was subjected during winterization. The term "crystallization equilibrium" is used herein to indicate that an equilibrium had been reached between the solid phase (crystals) and the liquid phase of the oil.

In general, winterization can be applied to any glyceride oil. The process is generally used commercially only for cottonseed oil and for that and other vegetable oils which have been lightly hydrogenated or rearranged, either in a random or directed manner.

To exemplify the crystal inhibiting characteristics of the novel compositions of this invention, 1-palmitoyl-2,3-di-(β-carbethoxypropionin) was added to winterized cottonseed oil at levels of 0.1 and 1%. When the resulting mixture was stored at 32° F. and observed for the formation of crystals, the compound of this invention was found to be as effective a crystallization inhibitor in salad oils as oxystearin, a well-known crystallization inhibitor food additive.

The compositions of this invention were found to be very good with respect to heat stability and when used in a standard smoke point test at the 5% level was found to have a smoke point of 390° F. These substances were further found to reduce the Solids Content Index of fats, such reduction apparently being due to solubilization of the glycerides.

The invention having been described, what is claimed is:

1. In the process of winterizing oil comprising the steps of chilling a liquid oil to a temperature substantially below 70° F., permitting the chilled oil to remain at that temperature until crystallization equilibrium has been obtained, and separating the resultant mixture of crystals and oil to obtain a crystal fraction and a liquid oil fraction, the improvement which consists of adding to the oil a composition of matter having the formula

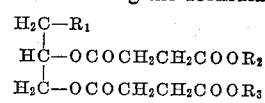

wherein $R_1$ is an alkanoyloxy group containing from 12 to 20 carbon atoms, and $R_2$ and $R_3$ are alkyl groups containing from one to three carbon atoms in the molecule in an amount of from about 0.05 to about 1.0% by weight of oil to be winterized.

2. The process of claim 1 in which the amount of said composition added is from about 0.2 to about 0.6% by weight of the oil to be winterized.

3. The process of claim 1 in which said composition is 1-palmitoyl-2,3-di-(β-carbethoxypropionin) and is added in an amount of from about 0.05 to about 1.0% by weight of the oil to be winterized.

4. The process of claim 1 in which said composition is 1-palmitoyl-2,3-di(β-carbethoxypropionin) and is added in an amount of from about 0.2 to about 0.6% by weight of the oil to be winterized.

No references cited.

HENRY R. JILES, *Primary Examiner.*

A. M. TIGHE, *Assistant Examiner.*